United States Patent
Wang et al.

(10) Patent No.: US 8,059,195 B2
(45) Date of Patent: Nov. 15, 2011

(54) ELECTRONIC DEVICE WITH SLIDEABLE COVERS

(75) Inventors: Xiao Wang, Shenzhen (CN); Ming-Chi Chang, Taipei-Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 322 days.

(21) Appl. No.: 12/538,834

(22) Filed: Aug. 10, 2009

(65) Prior Publication Data

US 2010/0045842 A1    Feb. 25, 2010

(30) Foreign Application Priority Data

Aug. 22, 2008   (CN) .......................... 2008 1 0304139

(51) Int. Cl.
*H04N 5/225* (2006.01)
*G03B 17/00* (2006.01)

(52) U.S. Cl. .................... 348/375; 348/376; 396/448

(58) Field of Classification Search .......... 348/375–376; 396/448

See application file for complete search history.

(56) References Cited

U.S. PATENT DOCUMENTS

| | | | | |
|---|---|---|---|---|
| 5,671,459 A | * | 9/1997 | Balling et al. | 396/535 |
| 5,754,906 A | * | 5/1998 | Yoshida | 396/448 |
| 7,225,002 B2 | * | 5/2007 | Lee et al. | 455/575.4 |
| 7,586,539 B2 | * | 9/2009 | Chiang | 348/376 |
| 7,724,302 B2 | * | 5/2010 | Yu et al. | 348/373 |
| 7,969,497 B2 | * | 6/2011 | Fukuma et al. | 348/333.06 |
| 2005/0044665 A1 | * | 3/2005 | Kuramochi | 16/341 |
| 2006/0128449 A1 | * | 6/2006 | Park | 455/575.4 |

* cited by examiner

*Primary Examiner* — Ngoc-Yen Vu
(74) *Attorney, Agent, or Firm* — Altis Law Group, Inc.

(57) ABSTRACT

An electronic device with slideable covers is provided. The electronic device includes a main body. Two sliding slots are defined in each of side surfaces of the main body, and a receiving space is defined in one end of each sliding slot, another receiving space is defined in opposite end of each sliding slot. The sliding slots communicate with the receiving spaces defined in two opposite ends of the sliding slot, and the width of the sliding slots is less than the width of the receiving spaces. The electronic device further includes two covers and four connecting members. Each cover includes two rings for fixing two connecting members. The connecting members slideably connect the covers to the main body. The connecting members are able to slide in the sliding slots and the receiving spaces.

5 Claims, 6 Drawing Sheets

ELECTRONIC DEVICE WITH SLIDEABLE COVERS

BACKGROUND

1. Technical Field

The disclosure relates to electronic devices and, particularly, to an electronic device having slideable covers.

2. Description of Related Art

Nowadays, electronic devices, such as mobile phones, with slideable covers are very popular. However, display panels are usually mounted on the slideable covers and exposed to the outside, and therefore, are easily scratched.

BRIEF DESCRIPTION OF THE DRAWINGS

The components of the drawings are not necessarily drawn to scale, the emphasis instead being placed upon clearly illustrating the principles of an electronic device with slideable covers. Moreover, in the drawings, like reference numerals designate corresponding parts throughout several views.

DETAILED DESCRIPTION

Figure 1:
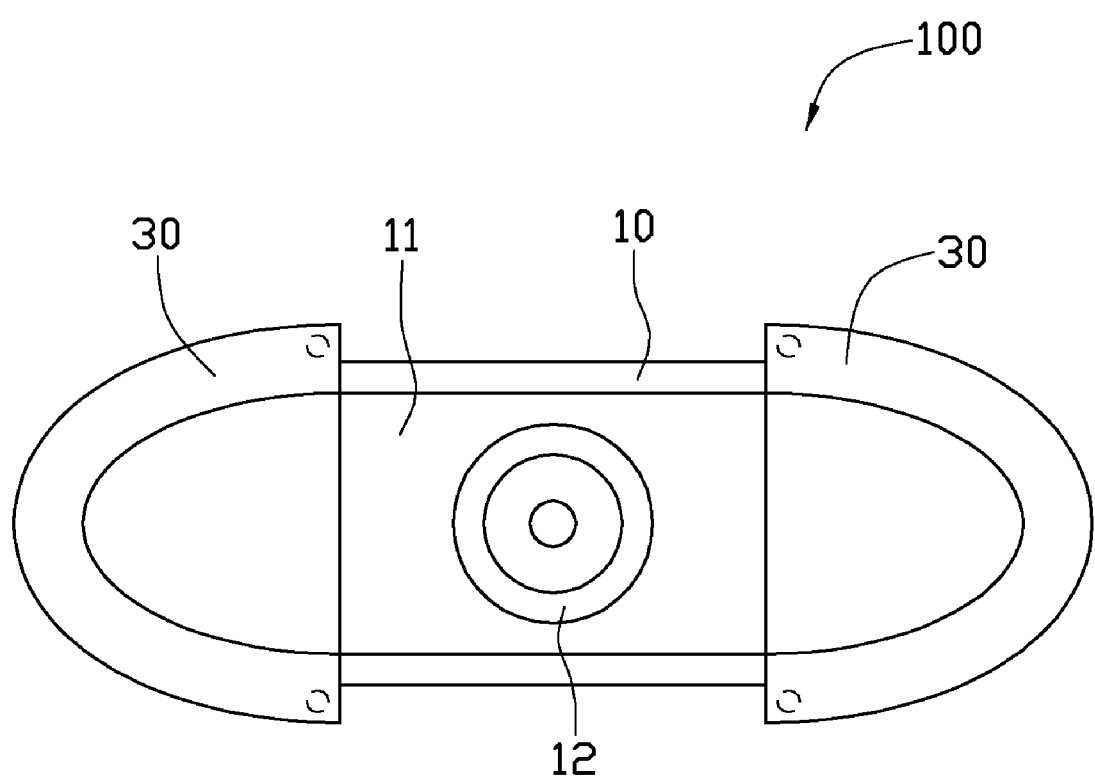
FIG. 1 is a schematic, front view of an electronic device with slideable covers in accordance with an exemplary embodiment, the covers are opened.
Figure 2:
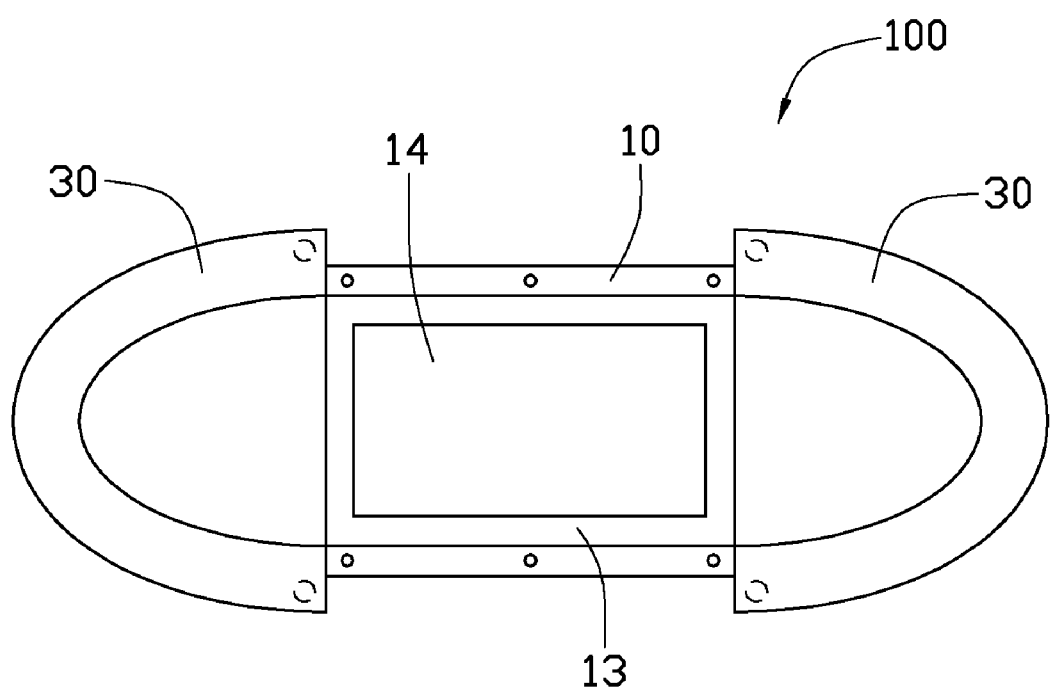
FIG. 2 is a schematic, rear view of the electronic device of FIG. 1.
Figure 3:
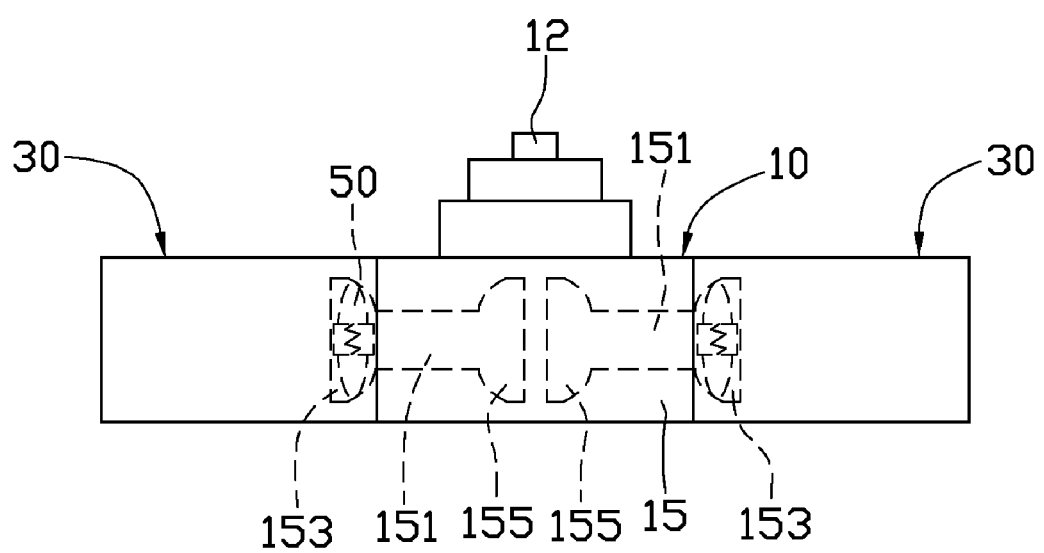
FIG. 3 is a schematic, top view of the electronic device of FIG. 1, a camera module of the electronic device is extended from the front surface.

Referring to FIGS. 1, 2, and 3, an embodiment of an electronic device 100 is illustrated. The electronic device 100 includes a rectangular main body 10, two hollow semi-elliptic covers 30, and four connecting members 50 for slideably connecting the main body 10 to the covers 30.

The electronic device 100, used here as an example, has a camera module 12. The camera module 12 is mounted on the front surface 11 of the main body 10. When the covers 30 are opened, the camera module 12 can be extended from the front surface 11 and used for taking photos. When the camera module 12 is contracted, the covers 30 can be slid to cover the main body 10 and the camera module 12. A display panel 14 is mounted on the rear surface 13 of the main body 10. Two sliding slots 151 are defined in each of two opposite side surfaces 15 of the main body 10. A first receiving space 153 is defined in one end of each sliding slot 151, and a second receiving space 155 is defined in the opposite end of each sliding slot 151. Each sliding slot 151 communicates with the first receiving space 153 and the second receiving space 155, and the width of the sliding slot 151 is less than the width of both the first receiving space 153 and the second receiving space 155.

Figure 4:
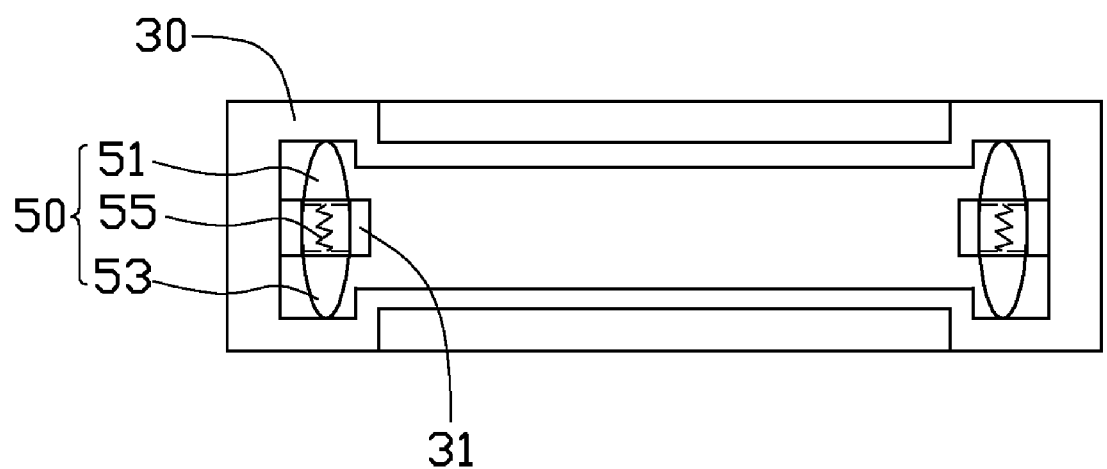
FIG. 4 is a schematic, rear view of a cover of the electronic device of FIG. 1, having two rings and two connecting members received in the rings respectively.

Referring to FIG. 4, two rings 31 are respectively mounted on the inner surface of the cover 30 for fixing two connecting members 50 respectively.

Each of the connecting members 50 includes two positioning members 51 and 53, and an elastic member 55. One end of the elastic member 55 is attached to the positioning member 51, and another opposite end is attached to the positioning member 53. Both the exterior radius of the positioning member 51 and the positioning member 53 are less than the inner radius of the ring 31, and the elastic member 55 is received in the ring 31. Therefore, when the elastic member 55 is compressed, the positioning members 51 and 53 can be partially received in the ring 31. In the exemplary embodiment, the positioning members 51 and 53 are made of metal material and are substantially semi-spherical, and the elastic member 55 is a spring.

Figure 5:
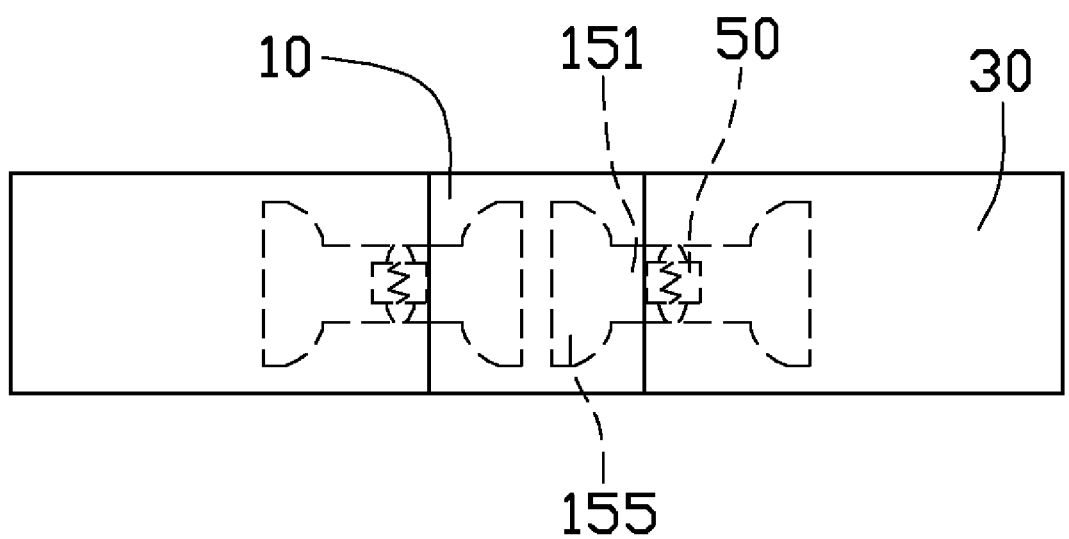
FIG. 5 is a schematic, top view of the electronic device of FIG. 1, with the covers slid partially closed.
Figure 6:
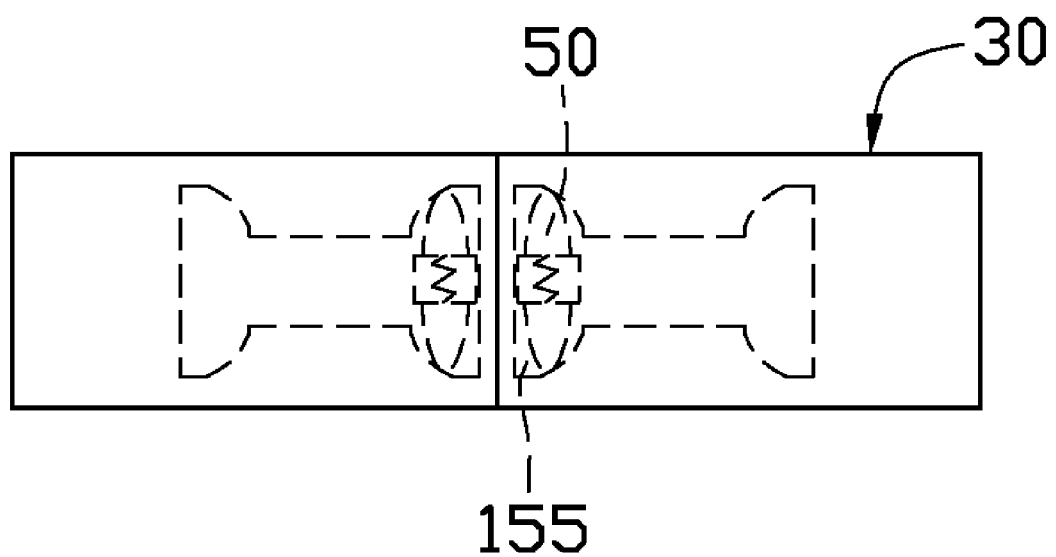
FIG. 6 is a schematic, top view of the electronic device of FIG. 1, with the covers slid fully closed.

Referring to FIGS. 3, 5-6, in FIG. 3, the electronic device 100 is in an open state, and the camera module 12 is extended from the front surface 11. When the electronic device 100 is in the open state, the connecting members 50 are fully received in the first receiving spaces 153, the elastic members 55 push the positioning members 51 and 53 to extend to keep the electronic device 100 in the open state. In FIG. 5, the camera module 12 is contracted, and the covers 30 are slid closed. When the covers 30 are slid, the connecting members 50 are driven to slide into the sliding slots 151, the sidewalls of the sliding slots 151 push the connecting members 50 to contract, and compress the elastic members 55. In this way, the length of the connecting members 50 is shortened, and the connecting members 50 can slide along the sliding slots 151. In FIG. 6, the covers 30 are fully closed and cover the main body 10, and the connecting members 50 have been slid into and are fully received in the second receiving spaces 155, thus the elastic members 55 recover and push the positioning members 51 and 53 to extend to keep the covers 30 in the close state.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. An electronic device with slideable covers, comprising:
   a main body defining two sliding slots in each of side surfaces, and a receiving space in one end of each of the sliding slots and another receiving space in the opposite end of each of the sliding slots, wherein each of the sliding slots communicate with the receiving spaces defined in two opposite ends of the sliding slot, and the width of the sliding slots is less than the width of the receiving spaces;
   two covers, wherein each of the covers comprises two rings; and
   four connecting members slideably connecting the covers to the main body, each of the connecting members comprising two positioning members and an elastic member disposed between the positioning members, wherein the connecting members are fixed in the rings of the covers and are able to slide in the sliding slots and the receiving spaces.

2. The electronic device with slideable covers as described in claim 1, wherein the positioning members are semi-spherical.

3. The electronic device with slideable covers as described in claim 1, the exterior radius of each of the rings is less than the inner radius of each of the positioning members.

4. The electronic device with slideable covers as described in claim 1, wherein each of the elastic members is a spring.

5. The electronic device with slideable covers as described in claim 1, wherein a camera module is mounted on the front surface of the main body, and a display panel is mounted on the rear surface of the main body.

* * * * *